(12) United States Patent
Cummings

(10) Patent No.: US 11,492,099 B2
(45) Date of Patent: Nov. 8, 2022

(54) AIRCRAFT NACELLE HAVING ELECTRIC MOTOR AND THRUST REVERSING AIR EXHAUST FLAPS

(71) Applicant: Darold B Cummings, Coeur D'Alene, ID (US)

(72) Inventor: Darold B Cummings, Coeur D'Alene, ID (US)

(73) Assignee: Wright Electric, Inc., Brooklyn, NY (US)

( * ) Notice: Subject to any disclaimer, the term of this patent is extended or adjusted under 35 U.S.C. 154(b) by 471 days.

(21) Appl. No.: 16/389,686

(22) Filed: Apr. 19, 2019

(65) Prior Publication Data

US 2020/0331589 A1 Oct. 22, 2020

(51) Int. Cl.
| | | |
|---|---|---|
| *B64D 27/24* | (2006.01) | |
| *B64C 15/00* | (2006.01) | |
| *B64D 27/26* | (2006.01) | |
| *B64D 29/02* | (2006.01) | |
| *B64C 7/02* | (2006.01) | |
| *B64D 33/04* | (2006.01) | |
| *B64D 27/12* | (2006.01) | |

(Continued)

(52) U.S. Cl.
CPC .............. *B64C 15/00* (2013.01); *B64C 7/02* (2013.01); *B64D 27/12* (2013.01); *B64D 27/14* (2013.01); *B64D 27/26* (2013.01); *B64D 29/02* (2013.01); *B64D 33/02* (2013.01); *B64D 33/04* (2013.01)

(58) Field of Classification Search
CPC ........... B64C 3/32; B64C 7/02; B64C 11/001; B64C 2003/143; B64D 27/00; B64D 27/02; B64D 27/06; B64D 27/12; B64D 27/18; B64D 27/24; B64D 27/26; B64D 2027/264; B64D 29/00; B64D 29/02; B64D 29/04; B64D 33/00

See application file for complete search history.

(56) References Cited

U.S. PATENT DOCUMENTS

| | | |
|---|---|---|
| 3,081,597 A | 3/1963 | Kosin et al. |
| 6,102,332 A * | 8/2000 | Haxton .................... B64C 39/10 244/118.2 |
| 6,926,229 B2 | 8/2005 | Cummings et al. |

(Continued)

FOREIGN PATENT DOCUMENTS

| | | | | |
|---|---|---|---|---|
| DE | 202016000269 U1 * | 2/2016 | ............. | B64D 27/24 |
| WO | WO-2016188836 A1 * | 12/2016 | ............. | B64D 27/18 |

*Primary Examiner* — Richard R. Green
*Assistant Examiner* — Michael A. Fabula
(74) *Attorney, Agent, or Firm* — Morland C. Fischer

(57) ABSTRACT

An aircraft having a fuselage with a nose and a flat tail at opposite ends and a pair of wings extending therefrom. A pair of nacelles are detachably connected to the top of respective ones of the wings to be spaced from the fuselage to establish an air flow space therebetween. Each wing-mounted nacelle includes a plurality of fans, a corresponding plurality of electric motors to drive the fans, and dividers that separate the fans from one another. Each wing-mounted nacelle also includes a pair of rotatable air inlet slats at an air intake end and a pair of rotatable air exhaust flaps at an air exhaust end that are rotated relative to one another to control horizontal propulsive thrust, thrust vectoring and thrust reversing of the aircraft. A third nacelle is mounted on top of the flat tail of the fuselage between a pair of horizontal turbo generators.

16 Claims, 6 Drawing Sheets

(51) Int. Cl.
  *B64D 27/14* (2006.01)
  *B64D 33/02* (2006.01)

(56) References Cited

U.S. PATENT DOCUMENTS

| | | |
|---|---|---|
| 7,150,432 B2 | 12/2006 | Ouellette et al. |
| 8,523,101 B2 | 9/2013 | Cazals et al. |
| 9,950,801 B2 * | 4/2018 | Viala .................... B64D 27/02 |
| D852,721 S * | 7/2019 | Cummings .................. D12/343 |
| 10,926,874 B2 * | 2/2021 | Giannini ............. B64C 29/0033 |
| 2004/0144889 A1 * | 7/2004 | Stuhr ...................... B64C 7/02 |
| | | 244/10 |
| 2006/0054739 A1 * | 3/2006 | Perez ....................... F02C 6/02 |
| | | 244/55 |
| 2013/0087661 A1 | 4/2013 | Brown et al. |
| 2014/0183296 A1 * | 7/2014 | Suciu ...................... F02K 3/06 |
| | | 244/54 |
| 2014/0367510 A1 | 12/2014 | Viala et al. |
| 2017/0203839 A1 * | 7/2017 | Giannini ................ B64D 27/24 |
| 2017/0361939 A1 | 12/2017 | Negulescu et al. |
| 2020/0047896 A1 * | 2/2020 | Dierksmeier .......... B64D 33/04 |
| 2020/0189758 A1 * | 6/2020 | Abramian .............. B64D 29/04 |

\* cited by examiner

AIRCRAFT NACELLE HAVING ELECTRIC MOTOR AND THRUST REVERSING AIR EXHAUST FLAPS

BACKGROUND OF THE INVENTION

1. Field of the Invention

This invention relates to a pair of airfoil-shaped, rectangular and multi-functional nacelles each of which having a plurality of horizontally extending electric motors and motor driven fans and being mounted on the top of and lying above respective ones of a pair of wings of an aircraft. The nacelles have rotatable air flow control surfaces at opposite air intake and, exhaust ends thereof to provide the aircraft with enhanced horizontal propulsive thrust, thrust vectoring and thrust reversing.

2. Background Art

Aircraft propulsion systems currently consist of large round nacelles carried underneath the aircraft wing. As engines and nacelles grow larger in diameter, they require moving the wing upward or increasing the length of the landing gear to provide increased ground clearance. The larger nacelles have more surface area which produces more drag. The round nacelle also takes up space along the lateral wing surface that inhibits its use for high lift. Consequently, the advantages of larger nacelles are offset, by increased drag and installation constraints. In addition, when one of the large engines fails, there is an increased yaw moment that is caused by drag on the nacelle, and a large vertical tail and rudder are required to offset the yawing moment. A large circular inlet is also easier to ingest a bird and suffer damage.

SUMMARY OF THE INVENTION

Disclosed herein is an aircraft including a fuselage having a round nose at the front end, a tapered blown pitch flap at the opposite aft end, and a pair of outwardly extending wings. As an important feature of this invention, a pair of rectangular, multi-function nacelles are detachably connected to respective ones of the wings so as to be held entirely above the wings. The nacelles are positioned atop the wings so as to be spaced away from the fuselage and thereby establish air flow paths along the inboard wing between the fuselage and the nacelles by which to reduce air turbulence flowing into the nacelles when the aircraft is in flight.

Each of the pair of rectangular nacelles has a narrow air intake end, an opposite narrow air exhaust end, and a plurality of electric motors and motor driven fans extending horizontally between the air intake and exhaust ends. Divider walls run horizontally through the nacelle between pairs of the fans and motors to prevent incoming air from spilling between the fans. Each nacelle includes an air flow duct between movable air flow control surfaces that are located at the air intake and air exhaust ends of the nacelle by which to enable the aircraft to be provided with enhanced horizontal propulsive thrust, thrust vectoring and thrust reversing.

In particular, upper and lower air inlet slats at the air intake end of the nacelle are rotatable downwardly relative to the air flow duct to increase lift of the aircraft during takeoff. Upper and lower air exhaust flaps at the air exhaust end of the nacelle are rotatable upwardly or downwardly relative to the air flow duct to either slow the speed of the aircraft while landing or increase lift during takeoff. An intermediate air exhaust guide that is located between the air flow duct and the upper air exhaust flap of the nacelle is rotatable upwardly relative to the air flow duct to also slow the aircraft during landing. Upper and lower exhaust diverter flaps that are located between the upper and lower air exhaust flaps at the air exhaust end of the nacelle are rotatable relative to the air exhaust flaps to further slow the aircraft during landing or increase lift during takeoff.

Mounted on the top of the flat tail of the fuselage of the aircraft is a generally rectangular rear boundary layer nacelle. The rear nacelle is located between a pair of turbo generators which are held outwardly from the tail of the fuselage by respective horizontal tail sections. The rear nacelle has a plurality of fans and electric motors extending horizontally therethrough and rotatable yaw vanes located behind the fans and the motors. The rear nacelle and the pair of turbo generators are preferably located behind both the pressure bulkhead and the pressurized passenger cabin of the aircraft to avoid damage to the passenger cabin in the event of a rotor burst.

DESCRIPTION OF THE PREFERRED EMBODIMENT

Figure 1:
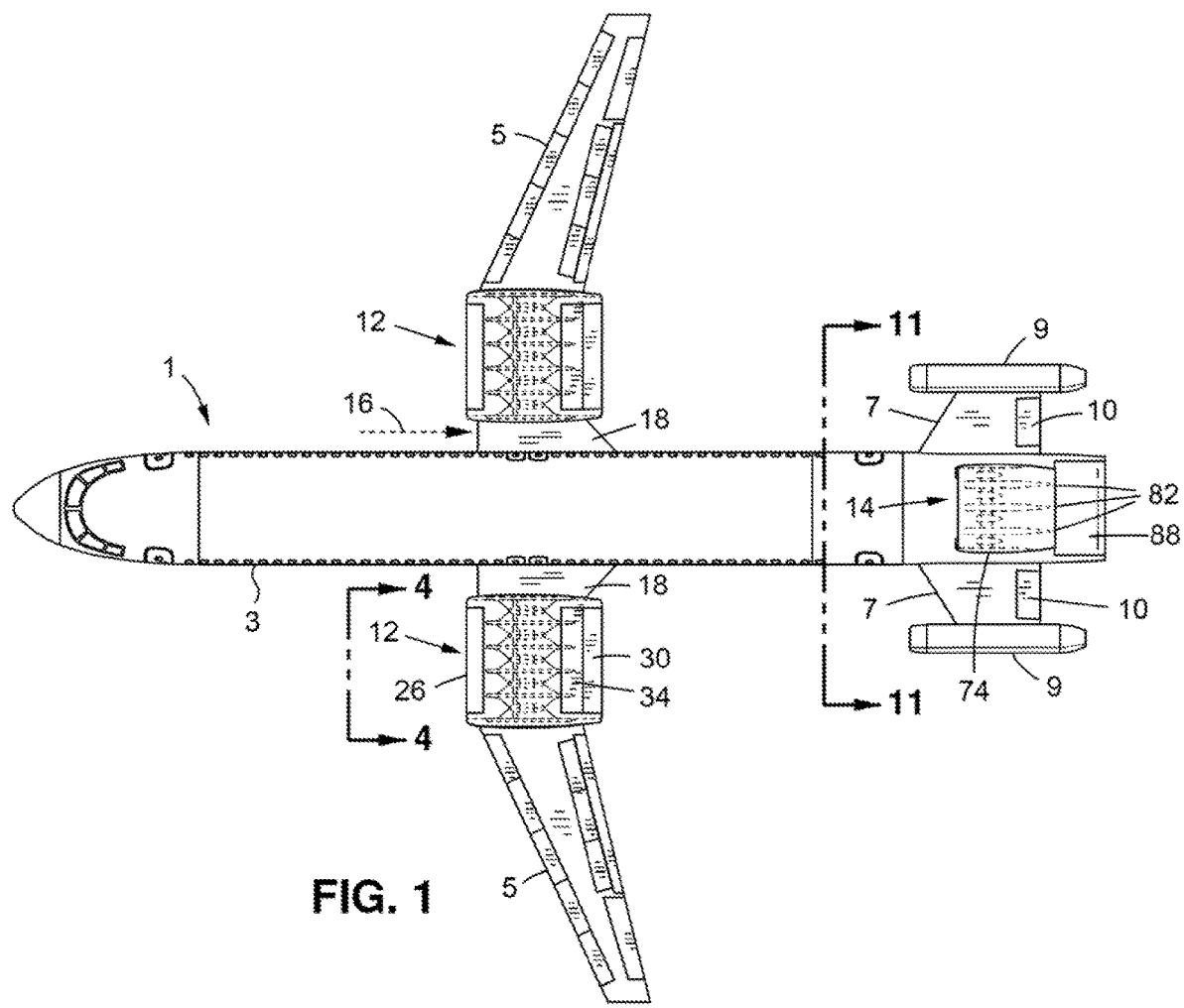
FIG. 1 is a top view of an aircraft having a pair of above-wing mounted nacelles and an above-tail mounted rear nacelle pursuant to a preferred embodiment of this invention.
Figure 2:
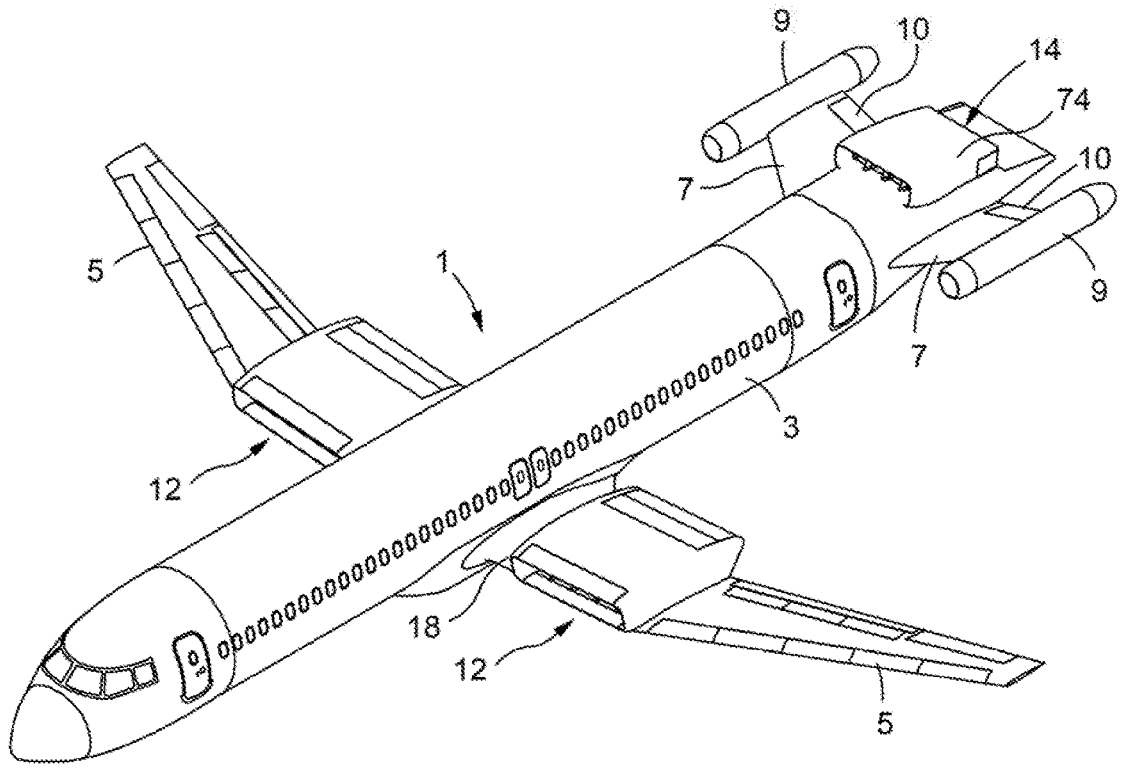
FIG. 2 is a front perspective view of the aircraft shown in FIG. 1.
Figure 3:
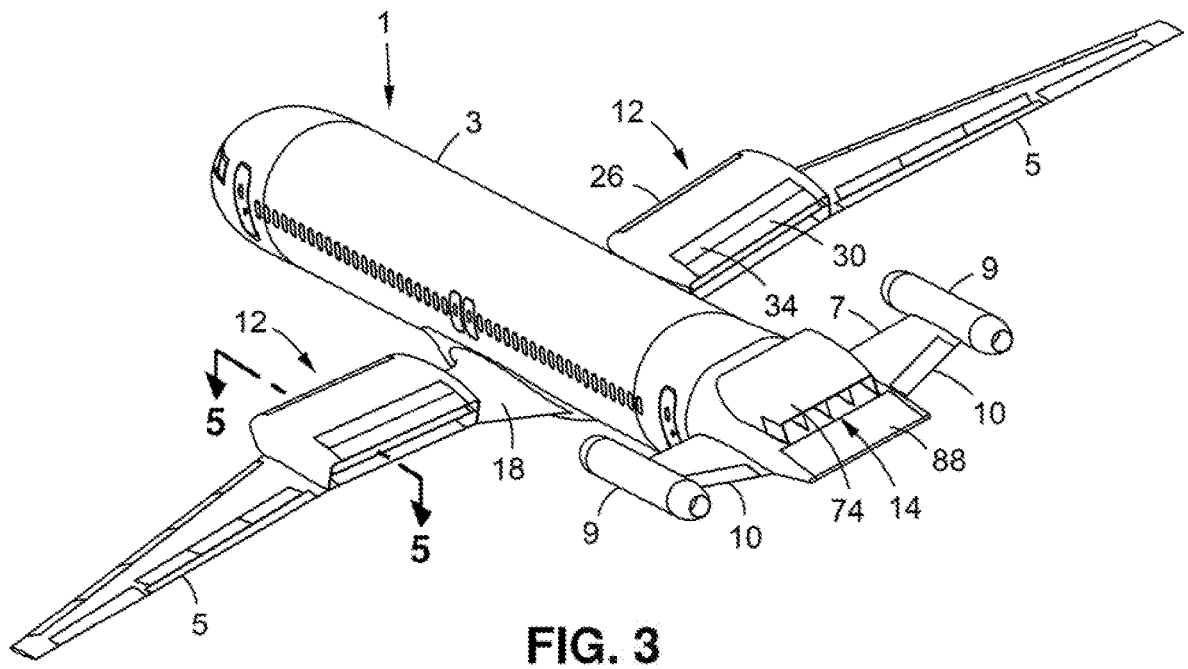
FIG. 3 is a rear perspective view of the aircraft shown in FIG. 1.

Referring initially to FIGS. 1-3 of the drawings, there is shown an aircraft 1 including a fuselage 3 hashing a round nose and a flat tapered tail, a pair of horizontal wings 5 extending outwardly and in opposite directions from the fuselage 3, a pair of horizontal tail sections 7 extending outwardly and in opposite directions from the tail of the fuselage 3, a pan of aft turbo generators 9 carried at the outside ends of respective ones of the tail sections 7, and elevator flaps 10 that are pivotally connected to the rear of respective ones of the tail sections 7. As an important improvement to the aircraft 1 of this invention relative to a conventional aircraft, the aircraft includes an airfoil-shaped, generally rectangular, and multi-function nacelle 12 that is mounted on the top of each wing 5 and a generally rectangular boundary layer nacelle 14 that is mounted on the top of the tail of the fuselage 3 between the turbo generators 9. As will be disclosed in greater detail hereinafter, the multi-function, wing mounted nacelles 1 have movable control surfaces that are adapted to provide the aircraft 1 with enhanced horizontal propulsive thrust, thrust vectoring and thrust reversing.

Each of the pair of multi-function nacelles 12 is mounted on respective ones of the pair of wings 5 of the aircraft 1 so as to be held above the top of the wings and positioned to avoid interference that might be caused by the wings so as to enable the nacelle to receive the maximum inflow of air. As one important feature, the nacelles 12 are mounted on the wings 5 so as to be spaced outwardly and away from the sides of the fuselage 3. Accordingly, an air flow path 16 (best shown in FIG. 1) is established along the inboard wing through a space 18 that is created between the fuselage 3 and each nacelle 12. By virtue of the foregoing, air turbulence that is experienced by the aircraft is advantageously minimized.

Figure 4:
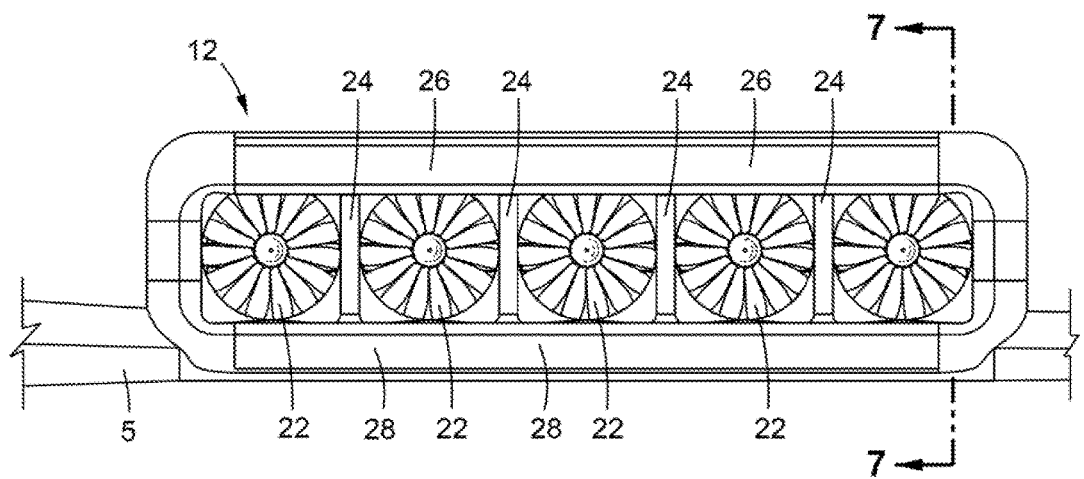
FIG. 4 shows one of the above-wing mounted micelles of the aircraft shown in FIG. 1 viewed in the direction of lines 4-4 thereof.
Figure 5:
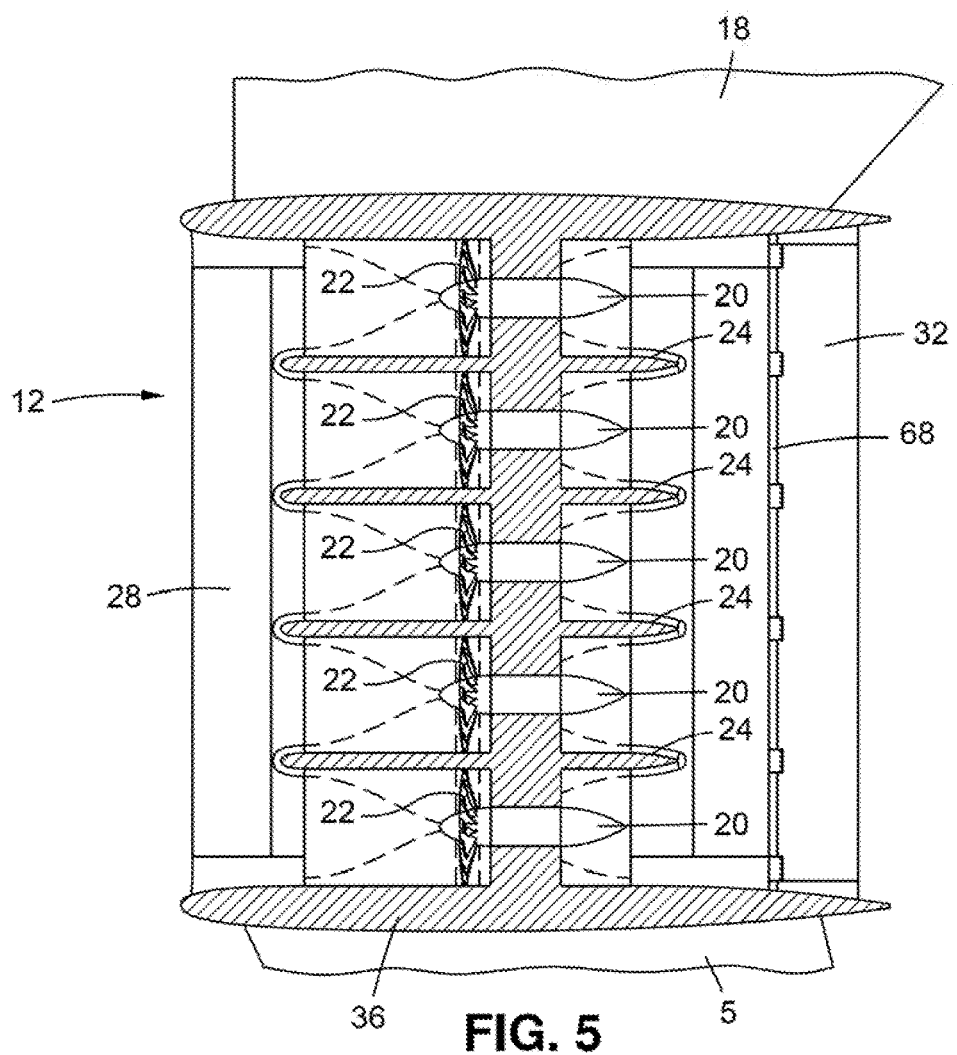
FIG. 5 is a cross-section of the wing mounted nacelle taken along lines 5-5 of FIG. 3.
Figure 6:
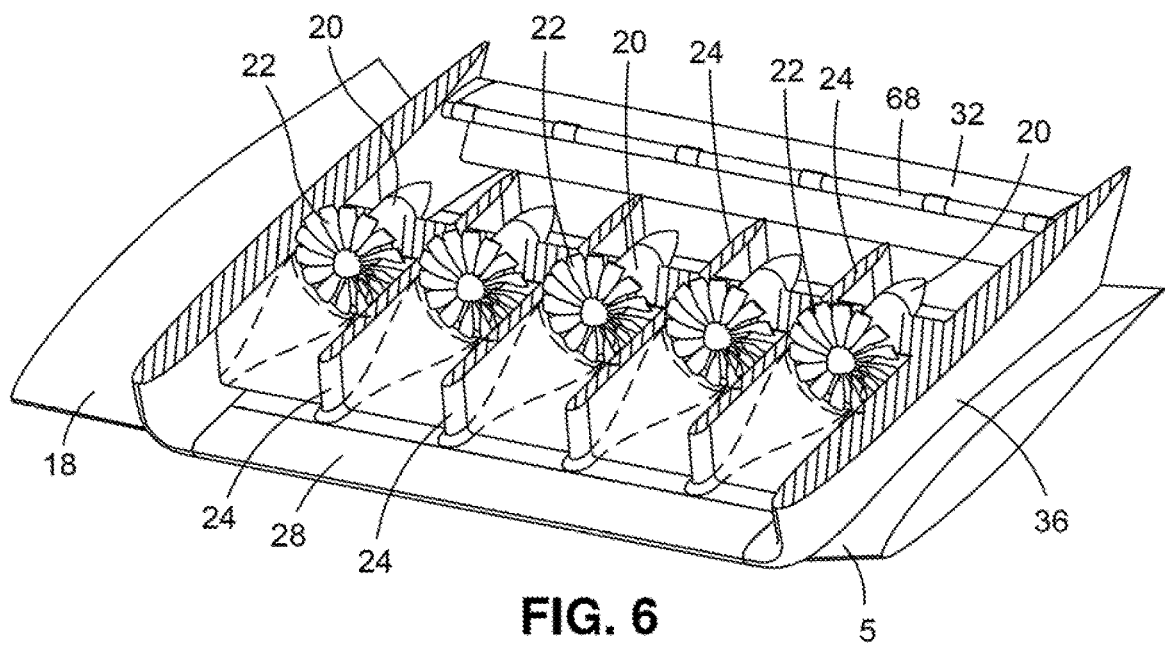
FIG. 6 is a top view of the wing-mounted nacelle shown in FIG. 5.

Turning now to FIGS. 4-6 of the drawings, details of each of the pair of identical above-wing mounted nacelles 12 are now provided. Each nacelle 12 includes a narrow air intake end, an opposite narrow air exhaust end, and a plurality of (e.g., five) electric motors 20 that are arranged side-by-side in spaced parallel alignment with one another. A fan 22 is mounted behind the air intake end of the nacelle 12 to be driven by a respective one of the electric motors 20. Each successive pair of motors 20 and fans 22 run horizontally through the nacelle 12 to be separated from one another by a horizontally extending divider wall 24 to prevent the air that flows into the air intake end of the nacelle 12 from spilling between the adjacent fans 22.

As will now be explained while referring to FIGS. 7-9 of the drawings, each above-wing mounted nacelle 12 also includes a pair of movable upper and lower air inlet slats 26 and 28 located at the air intake end thereof and a pair of movable upper and lower air exhaust flaps 30 and 32 located at the air exhaust end. The air inlet slats 26 and 28 and the air exhaust flaps 30 and 32 cooperate with the fan divider walls 24 so that the incoming air flowing through each rectangular nacelle 12 initially enters the inlet slats 26 and 28 in a generally rectangular shape, is transformed to a generally round shape by the divider walls 24, and is then converted back to a generally rectangular shape by the divider walls to be exhausted to the atmosphere by way of the exhaust flaps 30 and 32.

Each of the upper and lower air inlet slats 26 and 28 and the upper and lower air exhaust flaps 30 and 32 of each multi-function, wing mounted nacelle 12 is rotatable so as to cooperate with conventional wing control surfaces and thereby advantageously control the aerodynamic lift, horizontal propulsive thrust, thrust vectoring and thrust reversing of the aircraft 1. Each one of the nacelles 12 as shown in FIGS. 7-9 has a flow-through, aero dynamically curved duct 36 that is located between the air inlet slats 26 and 28 and the air exhaust flaps 30 and 32 and encloses the motors and the fans (only one motor and one fan 20 and 22 being shown). Each flow-through duct 36 is connected to one of the pair of wings 5 at the front and rear wing spars 38 and 40 thereof so that the nacelle 12 is mounted on the top of and above the wing 5 to receive and exhaust air in the manner just explained. A rotatable intermediate air exhaust slat 34 is positioned between the air flow duct 36 and the upper air exhaust flap 30 so that the upper air exhaust flap 30 extends rearwardly of the lower air exhaust flap 32.

Figure 7:
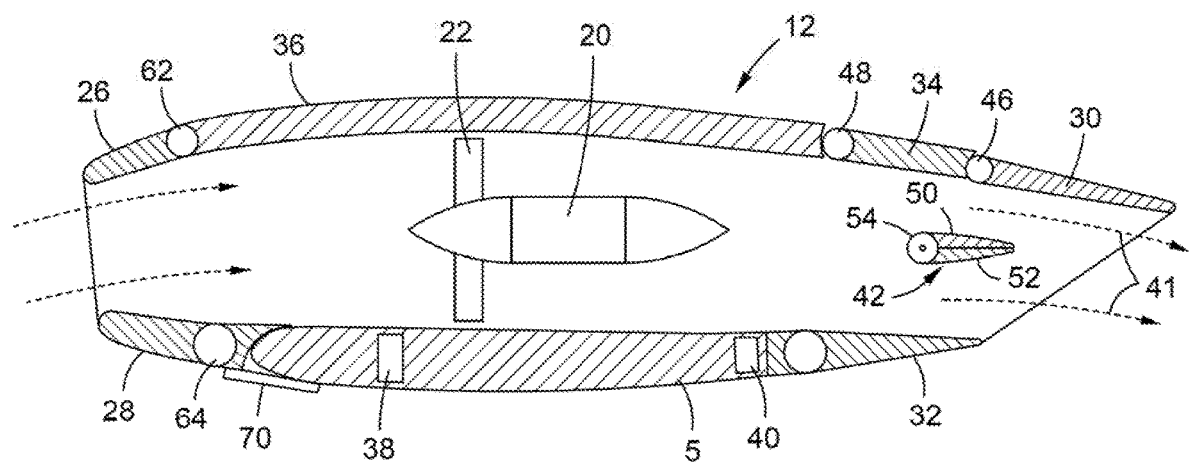
FIG. 7 is a crocs-section of the wing-mounted nacelle taken along lines 7-7 of FIG. 4 with rotatable an flow control surfaces thereof located in a cruise position.

More particularly, FIG. 7 shows the nacelle 12 connected to the wing 5 with the rotatable air inlet slats 26 and 28 and the air exhaust flaps 30 and 32 positioned relative to one another when the nacelle is in a cruise position with the aircraft flying level and maintaining a desired altitude. In this case, the upper and lower air inlet slats 26 and 28 at the air intake end of the nacelle 12 are horizontal and stationary and lie in generally axial alignment with the upper and lower air exhaust flaps 30 and 32 and the air exhaust slat 34 that are horizontal and stationary at the air exhaust end of the nacelle. Moreover, a rotatable aft exhaust air diverter 42 that is surrounded by the air exhaust flaps 30 and 32 also remains stationary and aligned parallel to flaps 30 and 32. Therefore, all of the incoming air is directed in a straight air exhaust path 41 through the flow-through duct 36 and into the motors 20, from which it is exhausted through the upper and lower air exhaust flaps 30 and 32 to the atmosphere.

Figure 8:
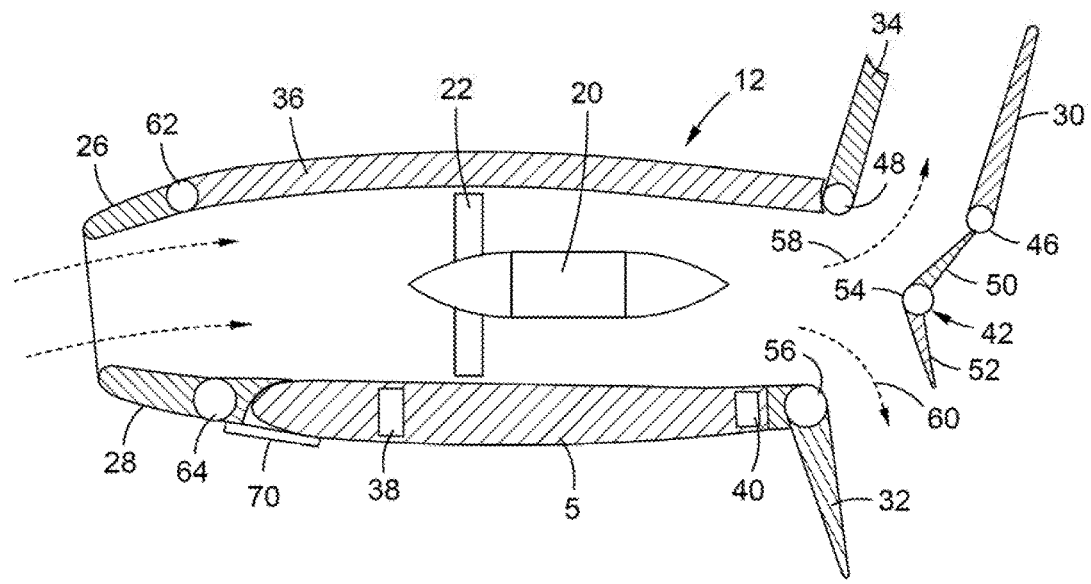
FIG. 8 is a cross-section of the wing-mounted nacelle shown in FIG. 7 with the rotatable air flow control surfaces thereof located in a thrust reversing position.

FIG. 8 shows the air inlet slats 26 and 28, the air exhaust flaps 30 and 32, and the intermediate air exhaust slat 34 positioned relative to one another, whereby the nacelle 12 is now in a thrust reversing position when it is necessary to slow the speed of the aircraft while landing without using the brakes. In this case, the rotatable air inlet slats 26 and 28 at the air intake end of the nacelle 12 remain horizontal and stationary. However, each of the upper air exhaust flap 30 and the intermediate air exhaust slat 34 are rotated upwardly at respective pivots 46 and 48. Likewise, a rotatable upper exhaust diverter flap 50 of the aft exhaust air diverter 42 is rotated upwardly at a pivot 54, and a rotatable lower exhaust diverter flap 52 of the aft exhaust air diverter 42 is rotated downwardly at the pivot 54 and away from the upper flap 50. What is more, the rotatable lower air exhaust flap 32 is rotated downwardly at a pivot 56, such that the pair of upper and lower air exhaust flaps 30 and 32 at the air exhaust end of the nacelle 12 extend in opposite directions.

Accordingly, a first portion of the air that enters the nacelle 12 through the air inlet slats 26 and 28 and flows into the motors 20 and fans 22 that are enclosed by the flow-through duct 36 is exhausted to the atmosphere in an upward direction by way of a first air exhaust path 58 that runs between the upturned intermediate air exhaust slat 34 and each of the similarly upturned upper air exhaust flap 30 and upper exhaust diverter flap 50. The remaining air that enters the nacelle 12 is exhausted to the atmosphere in a downward direction by way of a second air exhaust path 60 that runs between the downturned lower, air exhaust flap 32 and the similarly downturned lower exhaust diverter flap 52.

Figure 9:
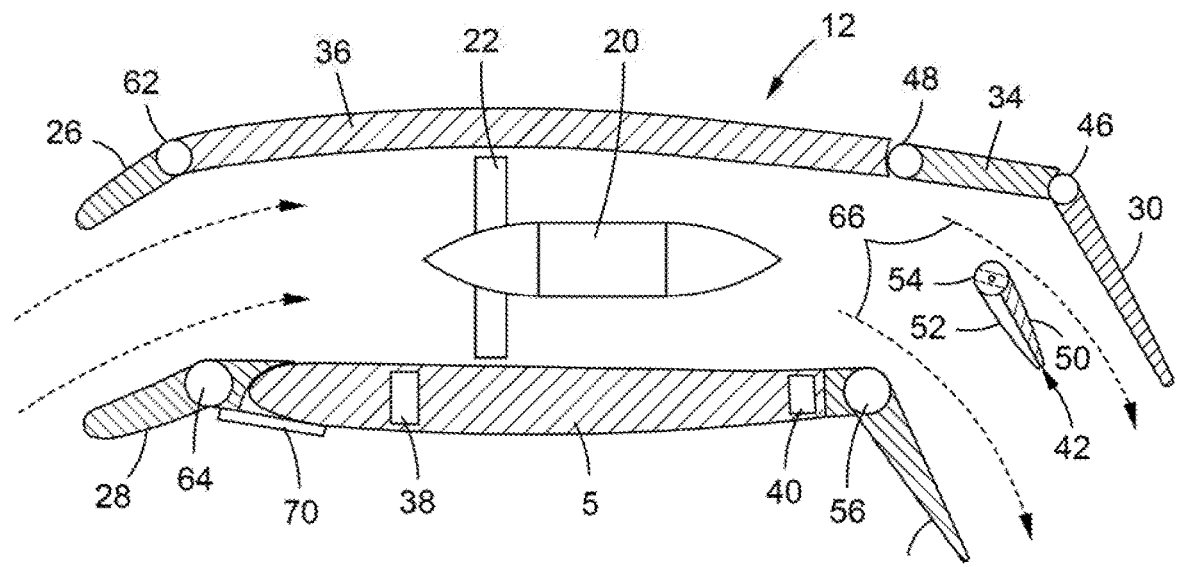
FIG. 9 is a cross-section of the wing-mounted nacelle shown in FIG. 7 with the rotatable air flow surfaces thereof in a takeoff position.

FIG. 9 shows the air inlet slats 26 and 28, the air exhaust flaps 30 and 32, the intermediate air exhaust slat 34, and the aft exhaust air diverter 42 repositioned relative to one another, whereby the nacelle 12 is now in position for taking off. In this case, each of the upper and lower air inlet slats 26 and 28 at the air intake end of the nacelle is rotated downwardly at respective pivots 62 and 64 so as to be positioned in spaced parallel alignment with one another and parallel to the ground during takeoff. Likewise, each of the upper and lower air exhaust flaps 30 and 32 at the air exhaust end of the nacelle 12 is rotated downwardly at their pivots 46 and 56 towards the ground so as to also be positioned in parallel alignment with one another. However, the intermediate air exhaust slat 34 remains stationary relative to and axially aligned with the flow-through duct 36. The upper and lower exhaust diverter flaps 50 and 52 of the aft exhaust air diverter 42 are simultaneously rotated at their pivot 54 to also face downwardly and lie between and in parallel alignment with the downturned upper and lower air exhaust flaps 30 and 32. The upper and lower exhaust diverter flaps 50 and 52 of air diverter 42 now lie face-to-face with respect to one another so that air will flow smoothly thereover to the atmosphere.

Accordingly, the air that enters the air intake end of the nacelle 12 through the downturned upper and lower air inlet slats 26 and 28 and flows into the motors 20 and fans 22 is exhausted from the air exhaust end of the nacelle to the atmosphere in a downward direction towards the ground by way of air exhaust paths 66 that run along, the downturned aft exhaust air diverter 42 and between the similarly downturned upper and lower air exhaust flaps 30 and 32.

It may be appreciated that by moving (i.e., rotating) the upper and lower air inlet slats 26 and 28 at the air intake end of the nacelle 12, the direction of the air flowing into the nacelle 12 to the motors 20 and fans 22 can be selectively adjusted and thereby tailored to achieve an optimum air flow depending upon whether the aircraft 1 is taking off, landing or simply cruising at altitude. Similarly, the air being exhausted from the air exhaust end of the nacelle 12 can be selectively adjusted by rotating the upper and lower air exhaust flaps 30 and 32, the intermediate air exhaust slat 34, and the upper and lower exhaust diverter flaps 50 and 52 at their respective pivots 46, 48, 56 and 54. In this regard, and by way of example, each of the aforementioned pivots may include a horizontally extending actuator controlled shaft (designated 68 in FIG. 6).

Figure 10:
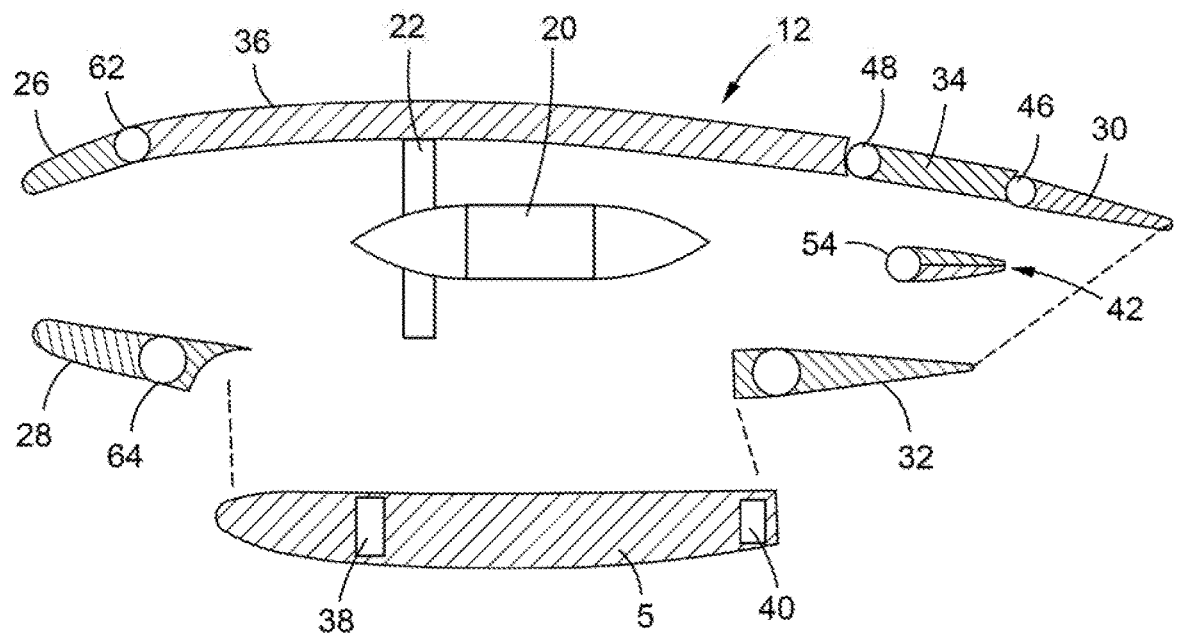
FIG. 10 is a cross-section illustrating the wing-mounted nacelle shown in FIG. 7 being detachably connected to and removable from one of the wings of the aircraft.

FIG. 10 of the drawings illustrates the detachable nature of the rectangular, multi function nacelle 12 of this invention with respect to one of the wings 5 on top of which the nacelle is mounted and detachably connected. As previously described, each nacelle 12 is detachably connected to a wing 5 of the aircraft adjacent to the front and rear wing spars 38 and 40. A fairing cover plate 70 is aerodynamically shaped to cover the joint at the interface of the nacelle 12 with the front of the wing 5 to which the nacelle is detachably connected. By virtue of the nacelle 12 being mounted so as to lie completely above the wing 5, it will be easily accessible for service. That is, the nacelle 12 can be detached from the wing spars 38 and 40 for repair and/or replacement without having to disassemble any portion of the wing or remove the entire wing from the aircraft.

Figure 11:
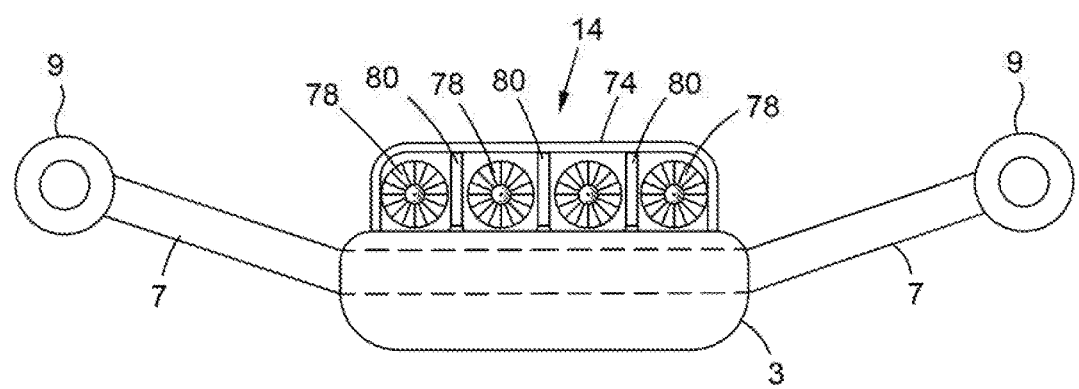
FIG. 11 shows the above-tail mounted nacelle of the aircraft viewed in the direction of lines 11-11 of FIG. 1.
Figure 12:
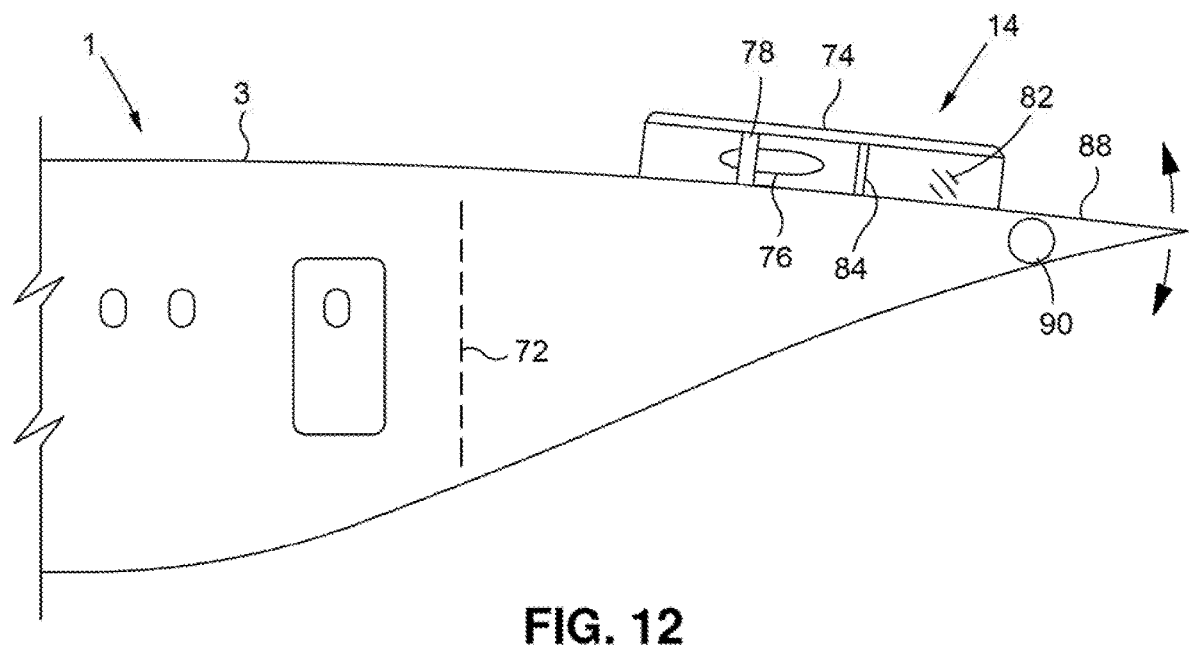
FIG. 12 is an enlarged detail showing the above-tail mounted rear nacelle of FIG. 11 positioned on top of the tail of the aircraft.

FIGS. 11 and 12 of the drawings illustrate details of the rear boundary layer nacelle 14 that is mounted on top of the tail of the fuselage 3 of the aircraft 1 so as to be positioned behind and spaced from both the pressure bulkhead 72 and the pressurized passenger cabin of the fuselage 3. As is best shown in FIG. 12, the tail of the fuselage 3 upon which the rear nacelle 14 is seated terminates at a flat, inwardly tapered blown pitch flap 88 that is rotatable up and down around a pivot 90 in order to control the vertical pitch of the fuselage nose. The rear nacelle 14 is affixed to and stands upwardly from the flat blown pitch flap 88 at the aft end of the fuselage 3 to lie between the aft turbo generators 9 (best shown in FIGS. 3 and 11). The horizontal tail sections 7 of the aircraft 1 at which the turbo generators 9 are carried run continuously and laterally through the aft tail below the rear boundary layer nacelle 14.

As in the case of the above-wing mounted nacelles 12, the rear boundary layer tail-mounted nacelle 14 includes a flow-through duct 74 through which air flows. The flow-through duct 74 surrounds a plurality of (e.g., four) electric motors 76 having respective fans 78 located in front of each. The electric motors 76 which drive the fans 78 are powered by the turbo generators 9 that are spaced outwardly from the fuselage 3 by the tail sections 7. Each successive pair of motors 76 and fans 78 is separated by a divider wall 80 to prevent the air that flows into the tail-mounted nacelle 14 from spilling between the fans 78.

As is best shown in FIGS. 1 and 12, vertical yaw vanes 82 extends rearwardly through the flow-through duct 74 of the nacelle 14 behind each of the electric motors 76. The yaw vanes 82 are rotatable at a vertical pivot 84 within the flow-through duct 74 by which to provide the aircraft 1 with improved yaw control at low speeds. The rotatable yaw vanes 82 advantageously eliminate the need for a vertically upstanding tail that is common to most aircraft to provide yaw control.

By virtue of locating the turbo generators 8 behind the rear pressure bulkhead 72 (of FIG. 12), the pressurized passenger cabin of the aircraft 1 is less likely to be penetrated in the event of a rotor burst. Thus, the cabin within which the passengers are seated will correspondingly be less likely to become depressurized so as to be better able to withstand a catastrophic event of the kind caused by such a rotor burst.

The invention claimed is:
1. An aircraft comprising:
a fuselage;
a nose at one end of said fuselage;
a tail at an opposite end of said fuselage;
a pair of wings extending outwardly from said fuselage; and
a nacelle including a fan, an electric motor to power said fan, and an air flow-through duct surrounding said fan, said nacelle having an air intake end at which air is received by said air flow-through duct when the aircraft is in flight and an air exhaust end lying opposite said air intake end at which the air is exhausted from said air flow-through duct to the atmosphere,
wherein the air exhaust end of said nacelle has a rotatable upper air exhaust flap and a rotatable lower air exhaust flap spaced one above the other, said rotatable upper air exhaust flap being rotatable from a horizontal position lying in parallel alignment with said air flow-through duct to an upturned position extending upwardly with respect to said air flow-through duct and to a downturned position extending downwardly with respect to said air flow-through duct, and said rotatable lower air exhaust flap being rotatable from a horizontal position lying in parallel alignment with said air flow-through duct and with the upper air exhaust flap in the horizontal position thereof to a downturned position extending downwardly with respect to said air flow-through duct at which to cooperate with said rotatable upper air exhaust flap in the upturned position thereof to control the direction of the air that is exhausted from the air flow-through duct at the air exhaust end of said nacelle,
said nacelle also including rotatable upper and lower exhaust diverter flaps located within the air flow-through duct at the exhaust end of said nacelle between said rotatable upper and lower air exhaust flaps, said upper and lower exhaust diverter flaps being rotatable relative to said air flow-through duct from a horizontal position lying face-to-face with respect to one another and in parallel alignment with each of the upper air exhaust flap in the horizontal position thereof and the lower air exhaust flap in the horizontal position thereof to a downward position lying in parallel alignment with each of the upper air exhaust flap in the downturned position thereof and the lower air exhaust flap in the downturned position thereof.

2. The aircraft recited in claim 1, wherein the upper and lower exhaust diverter flaps of said nacelle are also rotatable from said horizontal position thereof lying face-to-face with respect to one another to a position extending in different directions relative to one another such that the upper exhaust diverter flap lies in an axial alignment with the upper air exhaust flap in the upturned position thereof and the lower exhaust diverter flap lies in parallel alignment with the lower air exhaust flap in the downturned position thereof.

3. The aircraft recited in claim 1, wherein said nacelle is located above one of the pair of wings extending outwardly from said fuselage.

4. The aircraft recited in claim 3, further comprising another nacelle including another fan, another electric motor to power said another fan, and another air flow-through duct surrounding the another fan and the another electric motor, said another nacelle being located above the other one of said pair of wings extending outwardly from said fuselage.

5. The aircraft recited in claim 1, wherein said nacelle is detachably connected to one of the pair of wings extending outwardly from said fuselage so that said nacelle is removable from the one of said pair of wings without having to remove the one of said wings from said fuselage.

6. The aircraft recited n claim 1, wherein the air intake end of said nacelle includes a rotatable upper air inlet slat and a rotatable lower air inlet slat spaced one above the other, said rotatable upper and lower air inlet slats being rotatable from a horizontal position lying in parallel alignment with each other and with said air flow-through duct to a position lying at an angle with respect to said air flow-through duct to control the direction of the air flowing through the air intake end of said nacelle to said fan thereof.

7. The aircraft recited in claim 1, wherein said nacelle also includes an intermediate air exhaust slat lying in axial alignment with the rotatable upper air exhaust flap in the horizontal position thereof at the air exhaust end of said nacelle so that said rotatable upper air exhaust flap in the horizontal position thereof extends rearwardly of the rotatable lower air exhaust flap in the horizontal position thereof.

8. The aircraft recited in claim 7, wherein the intermediate air exhaust slat of said nacelle is rotatable from a horizontal position lying in said axial alignment with the rotatable upper air exhaust flap in the horizontal position thereof to a position extending upwardly with respect to the air flow-through duct of said nacelle at which to cooperate with said upper air exhaust flap in the upturned position thereof so that some of the air that is exhausted from the air exhaust end of said nacelle is exhausted between the intermediate air exhaust slat in the upwardly extending position thereof and the upper air exhaust flap in the upturned position thereof.

9. The aircraft recited in claim 1, wherein said nacelle is positioned on top of said fuselage.

10. The aircraft recited in claim 8, wherein the tail of said fuselage is flat, said nacelle positioned on top of said fuselage at said flat tail thereof.

11. The aircraft recited in claim 10, wherein the flat tail of said fuselage is rotatable up and down to control the vertical pitch of the nose of said fuselage.

12. The aircraft recited in claim 10, wherein the nacelle connected to said fuselage at the flat tail thereof has a yaw vane that is rotatable within said air flow-through duct to provide the aircraft with yaw control at low speeds.

13. The aircraft recited in claim 1, further comprising a pair of turbo generators located in spaced parallel alignment with one another at the tail of said fuselage such that said nacelle lies between said pair of turbo generators.

14. The aircraft recited in claim 13, wherein said fuselage includes a pressure bulkhead and a pressurized cabin located within said fuselage in which passengers are seated when the aircraft is in flight, said pair of turbo generators and said nacelle being located at the tail of said fuselage and rearwardly of each of said pressure bulkhead and said pressurized cabin of said fuselage.

15. The aircraft recited in claim 13, further comprising a pair of horizontal tail sections extending outwardly and in opposite directions from the tail of said fuselage so that said nacelle is located between said pair of horizontal tail sections, said pair of horizontal tail sections being connected to respective ones of said pair of turbo generators by which said pair of turbo generators are held by said pair of horizontal tail sections in said spaced parallel alignment with one another.

16. The aircraft recited in claim 1, wherein each of the air intake end and the air exhaust end of said nacelle is rectangular.

\* \* \* \* \*